M. Martin.

Piano Frame.

No. 3,660. Reissued Oct. 5, 1869.

Witnesses.

P. W. Bloomington

Wm. Irwin

Inventor

Martin Martin

Per Munn & Co

Attorneys

United States Patent Office.

MARTIN MARTINS, OF NEW YORK, N. Y.

*Letters Patent No.* 57,743, *dated September* 4, 1866; *reissue No.* 3,660, *dated October* 5, 1869.

IMPROVEMENT IN METAL FRAMES FOR PIANOS.

The Schedule referred to in these Letters Patent and making part of the same.

*To all whom it may concern:*

Be it known that I, MARTIN MARTINS, of New York, in the county New York, and State of New York, have invented a new and useful Improvement in Metal Tension-Frames for Piano-Fortes; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

Figure 1:
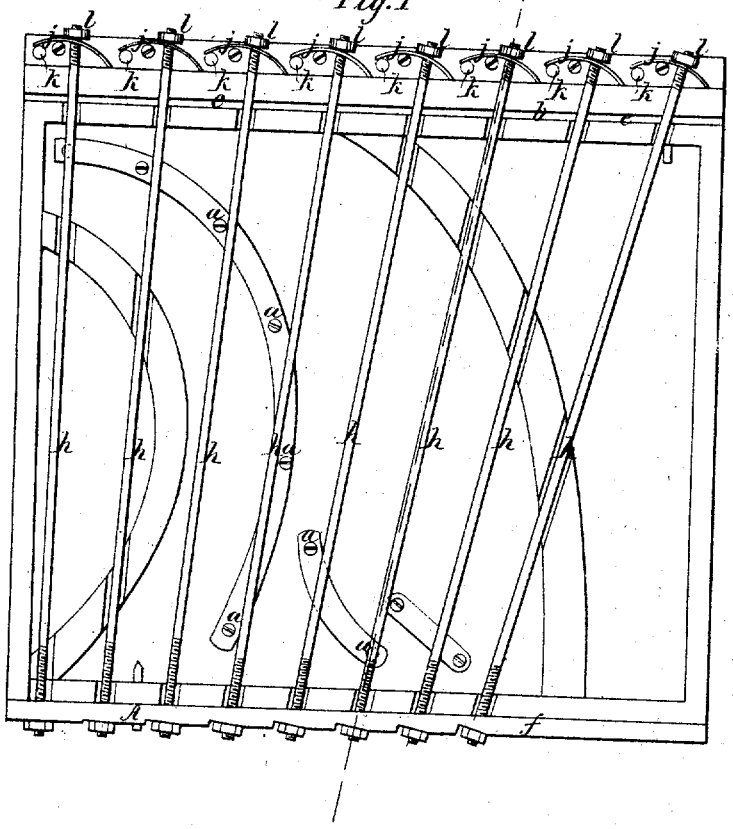
Figure 1 represents an inverted plan of the invention.
Figure 2:
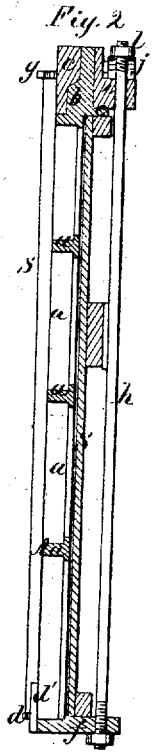
Figure 2 is a longitudinal section of the same.

This invention relates to certain improvements in the metal tension-frames of upright piano-fortes, which consists of a rectangular framing, having transverse strengthening bars, made of iron, and cast in one piece, employed for straining the cords, the cords being strained across one face of the frame, in the usual manner.

These frames are subject to considerable changes by expansion and contraction of the metal under the variations of temperature, whereby the tension of the cords is materially affected.

My invention consists in adapting the said frame, by springing or bulging it on the side toward the cords, to compensate for the said changes by expansion and contraction.

For this purpose, I employ tension-bolts, on the side of the frame opposite to the cords, and parallel with them, under such an arrangement that the frame may be sprung to any desired degree toward the cords.

A represents a metal frame, cast of iron, or any other suitable material, with a series of longitudinal or transverse braces or rafters, *a*, on its upper or front face, which extend across the frame, from one rim of the same to the other, and which serve to strengthen the frame, and to render it capable of sustaining the strain of the strings.

One end of the frame is provided with a double shouldered bracket, *b*, which is intended to support the wrest-plank, *c*; said wrest-plank is secured to the bracket *b*, by screws or any other suitable means, and it is provided with a series of sockets, to receive the turning-pins *g*.

From the turning-pins, the strings extend over suitable bridges to the hitch-pins *d*, in the usual manner, and the bridges rise from the sounding-board, and they are supported by suitable studs, whereby the same are elevated far enough to let the braces or rafters *a* pass through under them.

The hitch-pins are secured in a metal-plate, *d'*, which is fastened to the frame A.

From the lower or rear surface of the frame A project two lips, *e f*, and between these ribs the sounding-board S is introduced, as clearly shown in the drawing.

This sounding-board is supported by pins, or any other suitable means, and the metal frame A is strengthened by a series of screw-rods, *h*, which extend on its rear or lower surface, parallel with the strings, or nearly so, as shown in fig. 1 of the drawing.

These screws have their bearing at one end, in the lips *f*, of the frame A, and at the opposite end is an L-shaped plank, *i*, which is secured to the rear or lower surface of the bracket *b*, which supports the wrest-plank.

Suitable slots in the L-shaped plank *i* serve to admit the screws, the ends of which may extend through springs *j*, which bear at one end, each against a stud, K, and at the other against the L-shaped plank *i*, as clearly shown in the drawing.

These springs may serve to impart great elasticity to the bulging-apparatus, but good results are produced without them, and I propose to employ them or not as may best suit the circumstances of the case.

By tightening the nuts *l*, which are fitted on the screws, on the end of rods *h*, the springs are strained, and a yielding strain is exerted on the metal frame A, which strain can be increased or diminished at will.

By this strain, the metal frame is caused to bow or bulge toward the cords, and is thereby placed under such tension that the proper tension for the cords will be maintained under the variations of the frame due to the changes of temperature.

Whereas, if the cords be strained upon a dead frame of iron, constructed in the ordinary manner, they are liable to get out of tune by the variations of temperature, whereby the metal frame is caused to expand and contract to such a degree that the tension is too great at times, while at others it is very slight.

I do not wish to confine myself in carrying out my invention, to the precise form of the springs shown in the drawing, since springs of any desired form or shape may be applied, and if one spring is not sufficient under each nut, two or more springs may be combined, until the desired effect is produced.

Having thus described my invention,

I claim as new, and desire to secure by Letters Patent—

1. The cast-metal frame A, constructed as described, with the strengthening ribs *a*, double shouldered bracket *b*, supporting the wrest-plank *c*, the plate *d*, the lips *e f*, and L-shaped plank *i*, and provided with the tension-rods *h*, as herein set forth, for the purpose specified.

2. The L-shaped plank *i*, in combination with the lips *e f* of the frame A, and with the tension screw-rods *h*, constructed and operating substantially as and for the purpose described.

The above specification of my invention signed by me, this 28th day of January, 1869.

MARTIN MARTINS.

Witnesses:

FRANK BLOCKLEY,

E. GREENE COLLINS.